Patented Mar. 29, 1927.

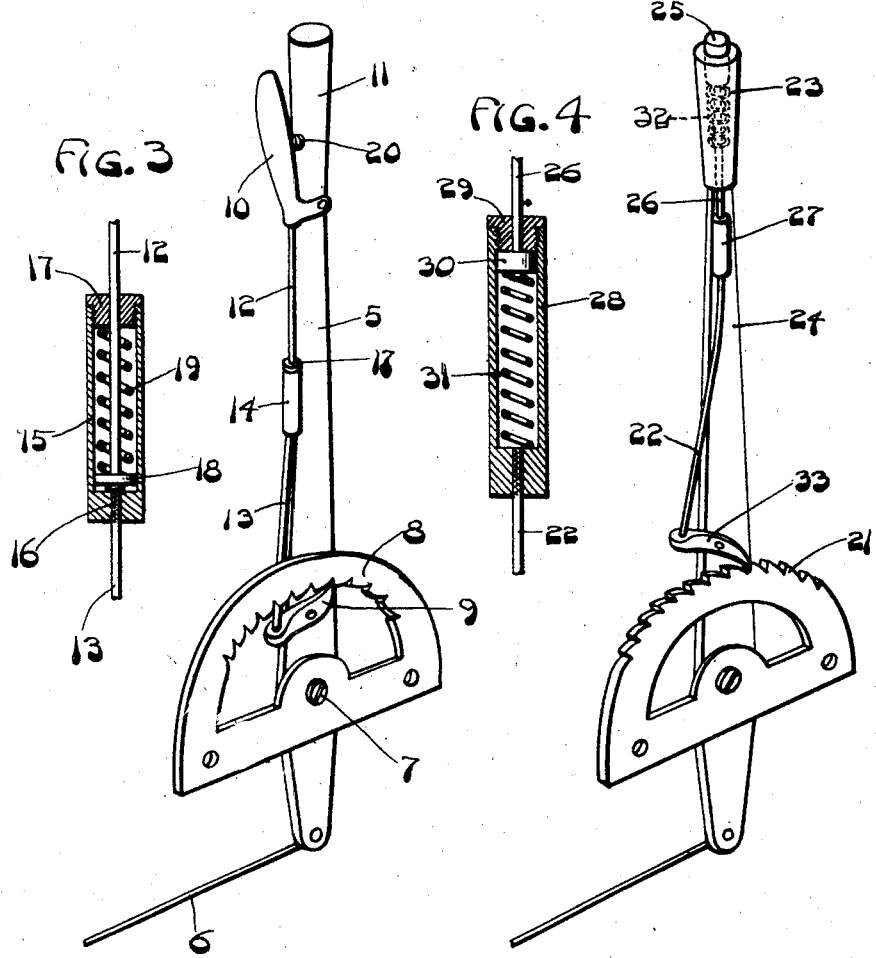

1,622,530

UNITED STATES PATENT OFFICE.

OTTO MILLER, OF CINCINNATI, OHIO.

BRAKE-LEVER-RELEASING DEVICE.

Application filed February 19, 1926. Serial No. 89,491.

This invention relates to an improved device which has for an object to accomplish the release of brake lever pawls with a minimum of effort and in a manner which is somewhat automatic whilst permitting of a firm grasp upon the lever handle in order to release the lever from brake operating position.

In the ususal brake lever and pawl construction, such as is found in automobile braking systems, the brake actuating and locking position of the lever is maintained by a pawl and ratchet construction applied to the lever and rendered available for operation by means of an auxilliary lever or finger actuated button located adjacent to or on the handle of the brake lever.

The operation of such locking pawls depends upon their freedom of movement in response to the pressure or tension of an actuating spring while the lever is being moved to brake tensioning position, the pawl during such movement operating over the teeth of a ratchet which cooperates therewith. The releasing action of the pawl is accomplished by drawing back or in a reverse direction upon the lever until the pawl is free from pressure against the ratchet teeth so that its actuating lever or button may be operated to remove it from the ratchet teeth, at which time the lever is moved into brake releasing position while the pawl is thus being held from the ratchet teeth.

This action, when initiated, necessitates two actions which must be performed simultaneously. One is the pull on the lever and the other is the operating of the pawl actuating handle or button. Such a dual operation is accomplished with one hand and, when the lever has been locked particularly tight, it is frequently a difficult operation because the operator can not grip the lever and pawl handles sufficiently tight to permit the initial or pawl releasing pull on the lever. Failure to grip the lever handle tight enough is occasioned because the fingers of the operator are not permitted to close tightly upon the lever handle, thus destroying the ability of the operator to hold onto the lever while giving it the necessary pawl releasing pull.

In my illustrated embodiment of the invention as shown in Figs. 1 and 2 and which I will describe presently, I have shown two common forms of brake lever locking devices, of which Figs. 3 and 4 are respectively enlarged sectional views of details.

Fig. 1 is a perspective view showing one form of brake lever and ratchet device employing a releasing device embodying my invention and which has been especially adapted to this form of lever and ratchet. Fig. 2 is a perspective view of another form of brake lever and ratchet device to which my improved releasing device has been adapted. Fig. 3 shows in enlarged section the form of releasing device which is applied to Fig. 1 construction while Fig. 4 shows in like manner the form of releasing device which has been applied to the form of construction shown in Fig. 2.

In the form of construction shown in Figs. 1 and 3, the lever 5 to which the brake rod 6 is attached, is pivoted at a point 7 in concentric relation with a ratchet 8 with the teeth of which a pawl 9, which is mounted on the lever, engages. This pawl, as is usual, is operated by a handle 10 which is pivoted at the base of the handle 11 of lever 5. Connecting the pawl 9 and handle 10 is a link which consists of two sections 12 and 13 which are connected by a yielding link 14. The construction of this link is such that the cylindrical shell 15, which constitutes the body of the link, is of cup formation and is mounted rigidly on one end of the link 13 to which the pawl is attached, as by screw threads 16. At the opposite end a cap 17 is screwed into the shell 15, the link 12 passing through this cap slidingly. The end of link 12 which occupies the body shell is provided with a washer 18 between which and the cap a spring 19 is located. Normally this spring holds the washer 18 and link 12 in retracted condition within the cylinder as shown, a spring 20 between handles 10 and 11 acting to hold them apart in condition to bring about operation of the device.

The operation of the form of releasing device I have just described is simple. Assuming that it is desired to actuate the brake it is merely necessary to exert a pull upon handle 11 without touching handle 10. Spring 19 will keep the links 12 and 13 in the condition shown in Fig. 3, while spring 20 will hold handle 10 away from handle 11 and thus maintain pawl 9 in yielding contact with the ratchet teeth. As the lever is brought to brake actuating position the pawl rides over the teeth and finally locks the lever in position to retain the brake in actuated condition. And now, that the brake may be released, it is merely necessary to press upon both handles 10 and 11 simultaneously. This compresses spring 20 and draws link 12 upwardly against the pressure of spring 19, but does not draw up link 13 or release pawl 9 because of its forceful engagement with the ratchet tooth with which it is cooperating to retain the brake lever in brake holding position. However, because the operator is enabled to bring the two handles together, a much better grip is permitted, thus giving the operator a greater chance to exert a pull on the lever without undue exertion and sufficient to allow the pawl to release itself under the pressure of spring 19 within shell 15 of the yielding link. By now retaining the grip on the two handles the lever may be allowed to return to brake releasing position ready for a repetition of the operation just described.

Figs. 2 and 4 are views corresponding to Figs. 1 and 3, showing my invention as applied to another form of brake actuating mechanism which, however, is quite similar to that just described. In this modified form the pawl 33 and ratchet teeth 21 are in reverse positions from those shown in Fig. 1, the teeth being on the upper side of the ratchet and the pawl being positioned to require the push of a link 22 instead of a pull as in the previously described construction. It is common practice in such an arrangement to provide the handle 23 of the lever 24 with a push button 25 which is operated by the thumb as the operator's fingers grip the handle 23. This push button is mounted on the pawl operating link usually, but in this embodiment it is mounted on a short link 26, between which and the pawl connected link 22 a yielding link 27 is placed. This yielding link consists of a shell 28 which is rigidly mounted on one of the links, as for example upon link 22. The opposite end of the shell is provided with a cap 29 through which link 26 slides, a piston or washer 30 being located on link 26 for bearing against a spring located within the shell 28. Normally spring 31 retains the two links apart as shown in Fig. 4, a spring 32 in the handle 23 also operating to lift upon links 26, 27 and 22 so as to force pawl 33 yieldingly against ratchet teeth 21.

The operation of the device is somewhat obvious, but I will describe briefly just what occurs. Assuming that it is desired to tighten the brakes, the operator merely draws back upon the handle 23 of lever 24. This allows the pawl 33 to pass over the teeth 21 in sequence until the lever has been drawn tight enough to tighten the brakes effectually. Assuming now that it is desired to release the brakes, it is merely necessary to press button 25 clear down to handle 23 whilst simultaneously gripping handle 23 tight enough to permit a backward pull upon the lever sufficient to allow the pawl 33 to release itself. This is accomplished because spring 31 has been compressed by washer 30 to push downwardly upon link 22, thereby lifting pawl 33 from the ratchet teeth as soon as it is released by the backward pull upon the lever. By now allowing lever 24 to move forwardly while still maintaining the grasp upon the handle and button, the brake is released because the pawl is held from engagement with the ratchet teeth.

Thus it will be seen that the novelty in my invention really consists in providing a construction in which the operator is enabled through the insertion of a yielding link, to grasp the handle tightly initially and to maintain that grasp throughout the operation involving the draw back pawl-releasing motion of the lever as well as the forward brake releasing motion thereof. In the usual manner of connecting the pawl with its actuating device on the lever handle, the operator really has to allow for two grips on the handle. One of these occurs when he grips both the pawl actuating handle or button with the lever handle simultaneously and the other occurs when the pawl is released, which necessitates a renewed or changed grip on the lever handle. This is uncomfortable and tends to disconcert the driver by giving him a feeling of insecurity or uncertainty, as well as to cause him considerable strain at times upon the tips of the fingers instead of upon the body or palm of the hand as would be normal were he permitted to have a grip such as he would naturally give the lever were the pawl handle or button not requiring attention simultaneously and with the same hand. This strain, inconvenience and discomfort is particularly noticeable to drivers having small hands or short fingers, as for example women drivers who also have but limited strength with which to operate such devices. In my improved device I have overcome all these objections and have in addition to this made a device which is positive in its operation so that the pawl is released completely and maintained so without thought or attention on the part of the driver.

Having thus described my invention what I claim is:

1. A releasing device for brake levers, consisting in combination with a handled brake lever, a ratchet, and a pawl on the lever for operation on the ratchet, of a pawl operating means on the handle, and a yielding link operatively connecting the means and the pawl.

2. A releasing device for brake levers, consisting in combination with a handled brake lever, a ratchet, and a pawl on the lever for operation on the ratchet, of a pawl operating means on the handle, and a link connecting the means and the pawl, said link having a portion adjacent to its handle operated end adapted to be moved with relation to its pawl connected end, whereby the pawl will be subjected to a yielding tension impelling it to movement from the ratchet upon releasing movement of the lever.

3. The combination with a handled brake lever, a ratchet, a pawl on the lever cooperating with the ratchet, and a pawl operating means on the lever adjacent to the handle, of a connection between the means and the pawl consisting of pawl connected link, and a yielding element between the links, adapted normally to hold the pawl into engagement with the ratchet, and to move the pawl yieldingly from the ratchet when the lever is moved to pawl releasing position following operation of the means.

In testimony whereof I have hereunto affixed my signature.

OTTO MILLER.